United States Patent [19]
Kalsi

[11] 3,825,030
[45] July 23, 1974

[54] LINED VALVES
[75] Inventor: Manmohan S. Kalsi, Houston, Tex.
[73] Assignee: ACF Industries, Incorporated, New York, N.Y.
[22] Filed: Mar. 20, 1973
[21] Appl. No.: 343,090

[52] U.S. Cl................. 137/375, 251/309, 251/366, 264/269
[51] Int. Cl....................... F16k 27/123, F16k 5/02
[58] Field of Search ............ 137/375; 251/309, 310, 251/366; 264/269

[56] References Cited
UNITED STATES PATENTS

| | | | |
|---|---|---|---|
| 2,961,214 | 11/1960 | Freed | 251/309 |
| 3,407,838 | 10/1968 | Boteler | 137/375 |
| 3,450,151 | 6/1969 | Heutzenroeder | 137/375 |
| 3,526,386 | 9/1970 | Gachot | 251/366 |
| 3,703,910 | 11/1972 | Smith | 137/375 |

Primary Examiner—Henry T. Klinksiek
Attorney, Agent, or Firm—Eugene N. Riddle

[57] ABSTRACT

A plastic lined valve structure particularly for handling corrosive ladings to protect all interior metal parts. The lining securely anchored to the valve body by a plurality of integral interlocking portions which are formed within recesses about the inner periphery of the valve body and axially extending bores communicating with the recesses. The method includes casting a plurality of radially spaced recesses along the inner circumference of inlet and outlet end sections, then drilling bores from the faces of the end sections through the cast recesses to the valve chamber, and next injecting a plastic material through the recesses and bores to provide the interlocking portions of the liner.

4 Claims, 9 Drawing Figures

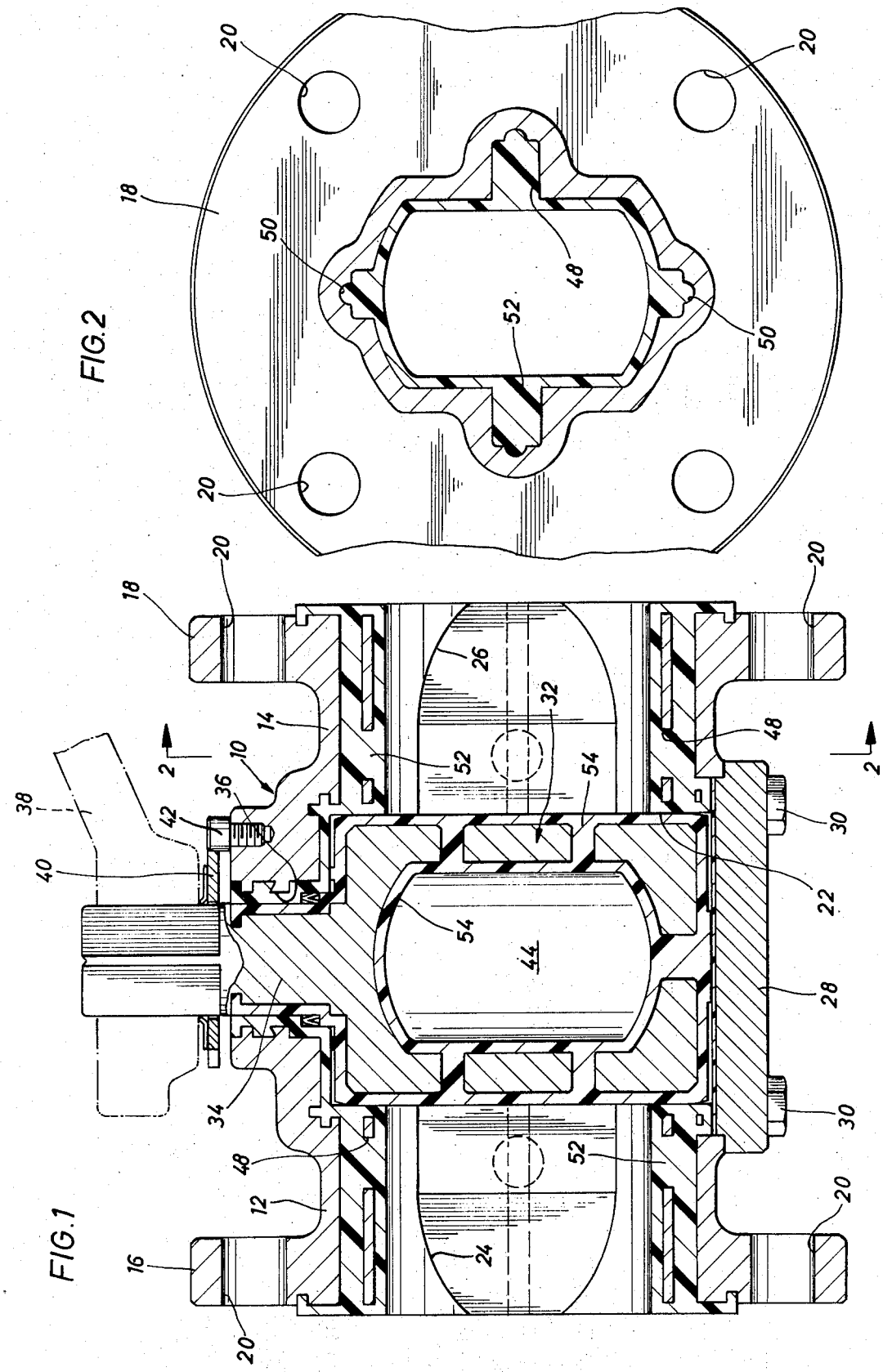

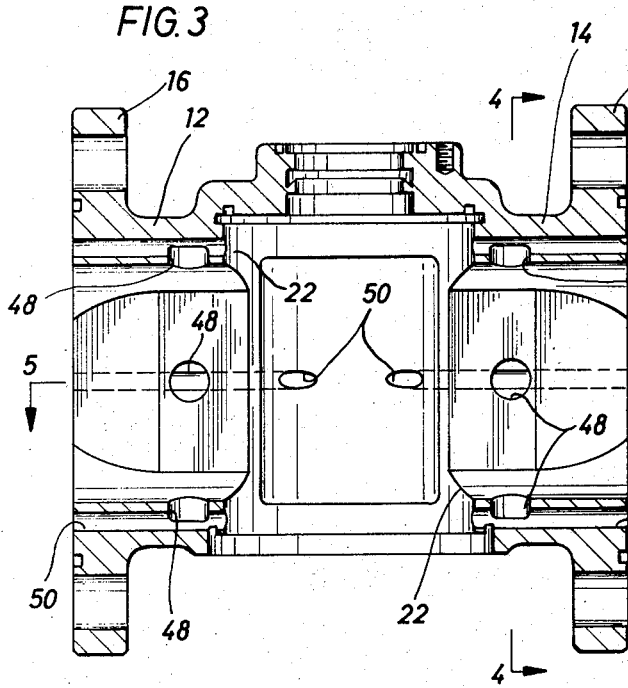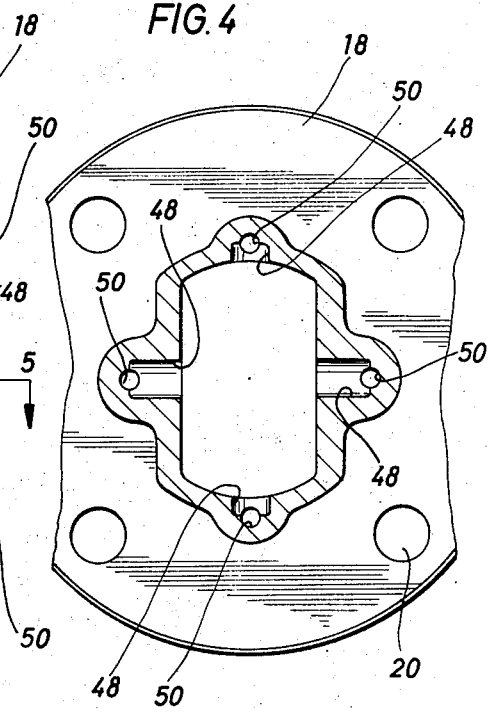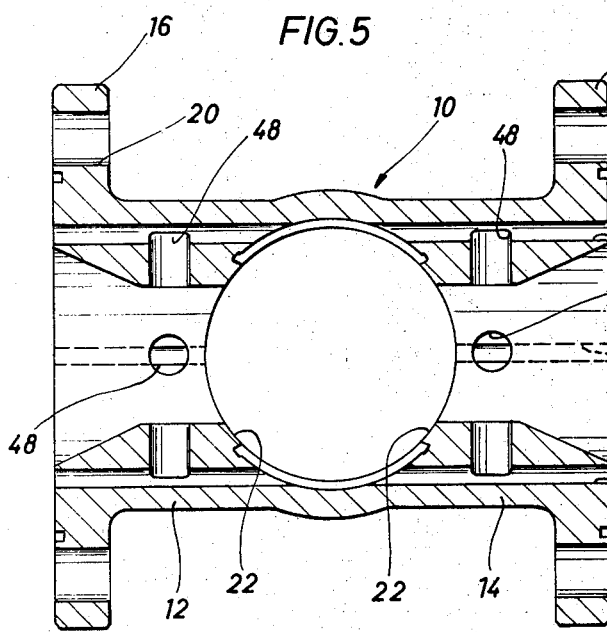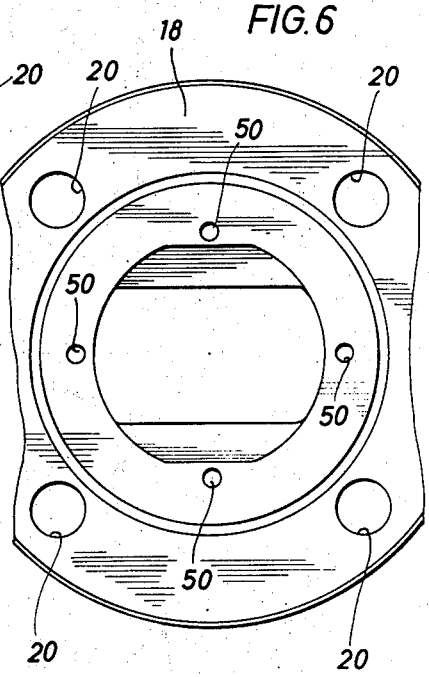

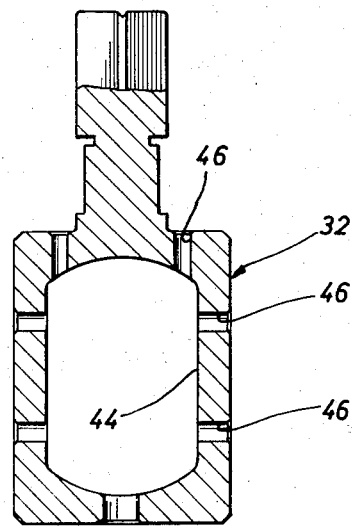
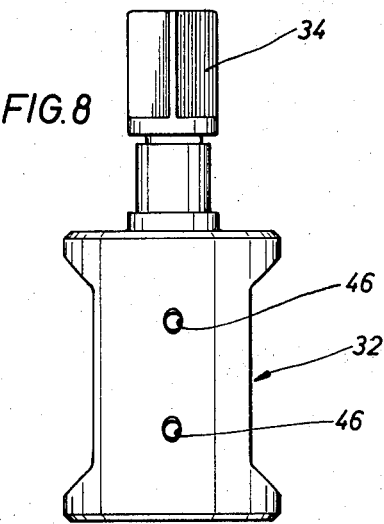
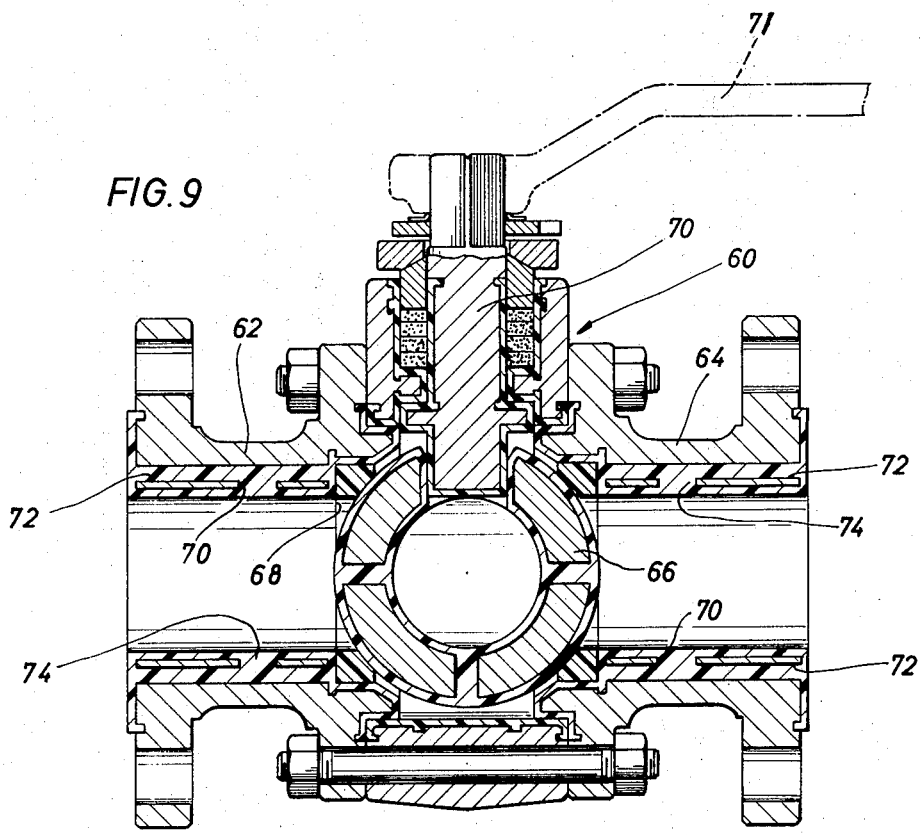

LINED VALVES

BACKGROUND OF THE INVENTION

Heretofore, plastic linings have been provided for valve structures to handle corrosive fluids, such as certain chemical and petroleum products. Such linings have commonly been provided by injection molding of the plastic in place. At times, it has been difficult to secure the lining to the metal as shrinkage occurs during curing of the plastic material after molding. Also, a vacuum is sometimes applied interiorly of the valve body and this also tends to pull the lining away from the adjacent metal surfaces. One prior method of securing the lining to the metal valve structure has involved the use of dovetail grooves along the interior of the valve body in which the plastic lining material is injected. The dovetail grooves interlock or secure the lining to the valve body but such grooves are costly to machine or cast and are sometimes difficult to position within the valve body.

DESCRIPTION OF THE PRESENT INVENTION

The present invention is directed to a plastic lined valve in which the valve lining is firmly secured to the valve body in an inexpensive and simple manner. The plastic lined valve comprises a plurality of spaced recesses about the inner circumference of inlet and outlet end sections, and a plurality of bores in the end section extend axially along the longitudinal axis of the valve from the outer ends of the end sections through the spaced recesses to the valve chamber. The liner provided about the inner circumference of the valve includes integral interlocking portions positioned in the recesses and bores. The plastic material is a plastic lining which is commonly provided by injection molding in place. When the plastic is injection molded, it flows through the recesses and the bores which have been drilled from the end faces of the end sections thereby to form integral interlocking portions of the liner which are secured firmly to the valve body structure. The method of lining the valve body includes casting the body section with a plurality of spaced recesses in the inlet and outlet end sections, then boring the end sections with axial passages extending from the ends of the section through the recesses to the valve chamber to provide fluid communication between the end bores and the recesses, and then injecting the plastic material within the passages and recesses, and about the inner circumference of the end sections to form a liner within the end sections interlocked to the plastic material in the recesses and axial passages. This type of interlocking arrangement can be provided for plug valves, ball valves, gate valves, or other types of valves having a body section in which such recesses and end bores may be provided.

In the accompanying drawings in which two of several possible embodiments of the invention are illustrated:

FIG. 1 is a longitudinal sectional view of illustration of the present invention employed with a plug valve structure;

FIG. 2 is a section taken generally along line 2—2 of FIG. 1;

FIG. 3 is a longitudinal sectional view of the valve body with the valve plug removed and illustrating the valve body prior to the injection molding of the plastic liner;

FIG. 4 is a section taken generally along line 4—4 of FIG. 3;

FIG. 5 is a section taken generally along line 5—5 of FIG. 3;

FIG. 6 is an end elevation of the valve body shown in FIG. 5;

FIG. 7 is a sectional view of the valve plug shown removed from the valve body;

FIG. 8 is an elevation view of the valve plug shown in FIG. 7; and

FIG. 9 is a longitudinal sectional view of a further embodiment of the invention illustrating the liner comprising the present invention employed with a spherical plug valve structure.

Referring now to the drawings for a better understanding of the invention, and more particularly to FIGS. 1 and 2, a valve body is generally indicated 10 and includes an inlet end section 12 and an outlet end section 14. End flanges 16 and 18 are provided on respective end sections 12 and 14. Openings 20 are provided in flanges 16 and 18 for connecting valve body 10 to a pipeline or other desired fluid condiut. A body cavity 22 is provided between end sections 12 and 14. Inlet flow passage 24 formed by end section 12 and outlet flow passage 26 formed by end section 14 communicate with body cavity or body chamber 22. An end closure plate 28 covers the bottom of body chamber 22 and is secured to valve body 10 by suitable bolts 30.

A valve plug generally indicated 32 is mounted within body cavity 22 for rotation and has a stem 34 extending therefrom through an opening 36 in valve body 10. An operating handle 38 is secured to the extending end portion of stem 34 for rotation of plug 32 between open and closed positions relative to flow passages 24 and 26. A stop plate 40 on stem 34 is adapted to engage stop 42 to limit rotation of valve plug 32. Valve plug 32 has a central fluid conduit 44 in fluid communication with fluid passages 24 and 26 when in an open position. The metal parts of the valve structure which are exposed to fluids in the fluid passageways are lined with a plastic material. A preferred plastic material forming the lining of the valve is polytetrafluoroethylene sold under the trademark "Teflon." However, other fluorocarbon polymers may be used as the liner, as for example, co-polymers of tetrafluoroethylene with other unsaturated organic compounds, such as ethylene and chlorotrifluoroethylene. In addition to fluorocarbon polymers, the lining may be formed of such synthetic organic plastics which are capable of being injected such as polyethylene, polypropylene, vinyl polymers such as polyvinylchloride, and the like.

Preferably, the synthetic organic liner material has a low coefficient of friction in addition to resistance to chemical attack. Certain fluoropolymers, such as polytetrafluoroethylene have such a low coefficient of friction as to be referred to as self-lubricating.

Although the thickness of the plastic liner is largely a matter of choice, for valves having a bore of around 2 inches in diameter, a liner of between one-sixteenth inch and one-eighth inch in thickness has been found to be satisfactory to provide the resilient sealing action as well as to protect the metal against corrosion.

Referring now more particularly to FIGS. 3–6 in which valve body 10 is shown without the liner being positioned thereon, body 10 is cast with a plurality of recesses 48 about the interior surface of end sections 12 and 14. Recesses 48 are radially spaced about the inner circumference of sections 12 and 14 and may be of a diameter such as one-half inch. Next, bores 50 for recesses 48 are drilled from the outer end faces of flanges 18 in a direction along the longitudinal axis of valve body 10 through recesses 48 and extend to the body cavity 22. A bore 50 for each recess 48 is provided and the diameter of bore 50 is of a diameter to permit an adequate flow of the plastic lining material upon injection. A diameter of between around one-sixteenth inch and one-half inch has been found to be satisfactory.

Suitable dies are placed within the opposed ends of body 10 and in valve chamber 22 and the plastic material is injected in the cavity adjacent the dies to form liner 52 about the interior surface of end sections 12 and 14. The plastic material flows within recesses 48 and drilled bores 50, and along the outer faces of flanges 16 and 18.

FIGS. 7 and 8 show plug 32 prior to the placing of the lining material thereon. Openings 46 extend through the body of valve plug 32 to communicate fluid passage 44 to the exterior of valve plug 32. A suitable die may be positioned within passageway 44 and the plastic material may be injected about the die to flow through openings 46 and about the outer circumference of plug 32 to form a lining 54 about the exterior surface of valve plug 32 and about the flow passage 44 therethrough thereby to protect the metal parts of plug 32 that are exposed to fluids in the flowline.

From the foregoing it will be understood that the present invention is directed to a plastic liner for a valve body which is secured by interlocking integral portions extending through radial recesses and axially extending bores connecting the end faces of the valve body with the main body cavity through the recesses. The recesses may be easily cast in the valve body and the bores may be easily drilled from the end faces of the end flanges through the recesses to the valve body chamber. After injection of the plastic material, the material flows into the recesses and bores to form the integral interlocking portions of the liner. In this manner the liner is firmly secured to the inner circumference of the valve body and minimizes or eliminates any separation of the liner from the metal portions of the valve body.

While FIGS. 1–8 show the liner being employed with a generally cylindrical plug type valve, it is to be understood that the invention may be employed with other types of valves. For example, as shown in FIG. 9, a ball valve structure is indicated at 60 including a valve body having end sections 62 and 64 with a spherical plug or ball valve member 66 mounted within body cavity 68 for rotation. A valve stem 70 is connected to ball member 66 and handle 71 may be rotated for movement of ball member 66 between open and closed positions. End sections 62 and 64 have recesses 70 therein and axial bores 72 connecting the outer faces of end sections 62 and 64 with valve cavity 68 through recesses 70. The liner material 74 is provided in a manner similar to that for the cylindrical plug valve structure shown in FIGS. 1–8.

What is claimed is:

1. A plastic lined valve comprising, an intermediate body section defining a body cavity, an inlet end section and an opposed outlet end section in fluid communication with said body cavity, a valve element in said body cavity movable between open and closed positions with respect to said end sections, at least one recess within the inner circumference of each the inlet and outlet end sections, at least one bore in each of said end sections extending axially along the longitudinal axis of the valve from the outer ends of said sections to at least the associated one recess, and a liner about the inner circumference of said end sections including integral interlocking portions positioned in said recesses and bores, said liner and interlocking portions being formed of a molded plastic material.

2. A plastic lined valve comprising, an intermediate body section defining a body chamber, an inlet end section and an opposed outlet end section having flow passages in fluid communication with said body chamber, a valve element in said body chamber movable between open and closed positions with respect to said end sections and having a conduit therethrough adapted for alignment with the flow passages in open position, at least one recess within the inner circumference of each the inlet and outlet end sections, a bore for the recess in said end sections extending axially along the longitudinal axis of the valve from the outer end of said sections through the associated recess to the body chamber, a plastic lining material about the inner circumference of said end sections defining the flow passages including integral interlocking portions positioned in said recesses and bores, and a plastic lining material about the inner circumference of the valve element defining the conduit therethrough.

3. A plastic lined valve as set forth in claim 2 wherein said valve element has openings extending through the body of the valve element from the conduit therethrough, and plastic lining material extends within said openings and the exterior of said valve element.

4. A plastic lined valve as set forth in claim 2 wherein said bores are of a diameter between around one-sixteenth inch and one-half inch.

* * * * *